United States Patent [19]

Damson et al.

[11] 4,452,072
[45] Jun. 5, 1984

[54] COMBUSTION CONDITION SENSOR

[75] Inventors: Eckart Damson, Stuttgart; Winfried Moser, Markgroningen; Franz Rieger, Aalen, all of Fed. Rep. of Germany

[73] Assignee: Robert Bosch GmbH, Stuttgart, Fed. Rep. of Germany

[21] Appl. No.: 410,696

[22] Filed: Aug. 23, 1982

[30] Foreign Application Priority Data

Oct. 7, 1981 [DE] Fed. Rep. of Germany ....... 3139837

[51] Int. Cl.³ ............................................ G01M 15/00
[52] U.S. Cl. ........................................... 73/116; 73/35
[58] Field of Search ................... 73/116, 35; 250/227; 350/319, 96.1; 313/129

[56] References Cited

U.S. PATENT DOCUMENTS 3,678,741 7/1972 Burley .................................. 73/116
3,978,720 9/1976 Ford .................................... 73/116

Primary Examiner—Jerry W. Myracle
Attorney, Agent, or Firm—Frishauf, Holtz, Goodman & Woodward

[57] ABSTRACT

To protect the light guide element of a combustion sensor, for example combined with a spark plug, and extending through a bore in the center electrode thereof against high temperatures and attach due to environmental conditions occurring within the combustion chamber, a protective element of a high temperature resistant, light transmitting ceramic, preferably alpha-crystalline aluminum oxide is located at the combustion end portion, for example in form of a disc 14, held in position by a turned-over flange of the end portion of the center electrode 13 of a spark plug-sensor combination.

10 Claims, 1 Drawing Figure

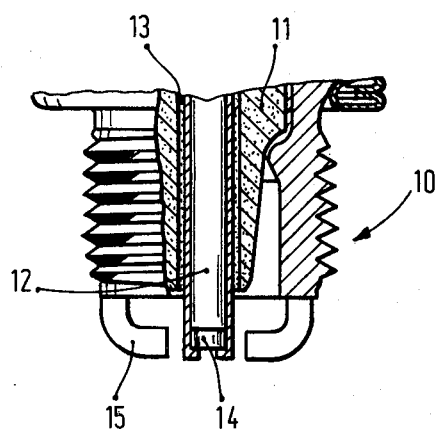

COMBUSTION CONDITION SENSOR

REFERENCE TO RELATED APPLICATION

Ser. No. 06/314,651 Filed Oct. 26, 1981, Muller & Rieger, assigned to the assignee of the present application and the disclosure of which is hereby incorporated by reference.

The present invention relates to a sensor to sense conditions of combustion in a combustion chamber, and more particularly the combustion chamber of an internal combustion (IC) engine, and especially to such a sensor capable of being combined with the spark plug of an externally ignited IC engine.

BACKGROUND

Optical sensors to obtain optical signals representative of physical processes and events within the combustion chamber of IC engines have been previously proposed. The optical signals are conducted by light guides to optical-electrical transducers to obtain corresponding electrical signals which, then, can be utilized to control operation of the IC engine. Such a utilization apparatus may, for example, include a control system to recognize knocking or pinging operation of the engine, and to then control the engine so that knocking or pinging operation is prevented.

Optically sensing combination events within the combustion chamber of an IC engine places rigorous demands on the optical pickup which must be exposed, physically, to the combustion conditions. The referenced earlier U.S. application Ser. No. 06/314,651, assigned to the assignee of the present application, and the disclosure of which is hereby incorporated by reference, describes a sensor which has a window made of quartz glass located at the combustion chamber of the IC engine, the quartz glass window being coupled to a light guide cable to conduct optical signals to the sensor element terminal remote from the combustion chamber. It has been found that extended use of such a sensor, particularly under operating conditions involving extremely high temperatures may cause damage to the quartz glass window, since quartz glass, although very resistant to high temperature, is not sufficiently sturdy to withstand the extremes of temperatures to which it may be exposed in the combustion chamber of some IC engines.

THE INVENTION

It is an object of the present invention to improve a sensor of the type described in the earlier, referenced application to prevent damage to the window exposed to the combustion chamber of the IC engine.

Briefly, the sensor has a housing, preferably in form of a spark plug housing, with a central bore through which a glass rod is fitted. The sensor bore may extend through the center electrode of a spark plug. In accordance with the invention, an end element is provided which separates the combustion chamber from the glass rod to protect the glass rod from high combustion temperatures. This window is made of a high temperature resistant, light transmitting element, typically a disc-like element. In a preferred embodiment, the disc element is alpha-crystalline aluminum oxide. The glass rod is preferably made of quartz glass.

For purposes of the present invention, the term "high termperature resistant" is intended to mean a material which has a better resistance to high temperatures than quartz glass and, additionally, has the characteristics of being optically transmissive. Alpha-crystalline aluminum oxide is a preferred material due to its availability and high temperature resistance characteristics, although other materials, for example comparable, or even better than alpha-crystalline aluminum oxide may be used.

The sensor has the advantage that the disc portion which is exposed to the combustion chamber has an extremely high melting temperature, and, further, is capable of resisting chemical attack occurring the combustion process and has the requisite hardness and strength to withstand the extreme of environmental conditions occurring with the combustion chamber of an internal combustion (IC) engine.

Using discs made of aluminum oxide has the further advantage that such discs are available in standard sizes since they are made as mass production elements for the watch industry and counter industry; the standard for aluminum oxide elements is published as German industry standard DIN 8257. Thus, optical sensors using such aluminum elements can be made inexpensively. The aluminum oxide sensors can also be readily combined with the center electrode of a spark plug so that, with simple, and readily available components, a combined spark plug-optical sensor can be constructed.

DRAWING

The single FIGURE is a fragmentary part sectional view of the end portion adapted for placement within the combustion chamber of IC engine of a combined sensor-spark plug.

A housing 10, formed with a customary screw thread for insertion through the cylinder block of an IC engine retains therein an insulating element 11 within which the center electrode of the spark plug is located. To provide an optical signal output, a rod 12 of quartz glass is centrally located within the insulating element 11. The rod of quartz glass 12 is surrounded by a metal sleeve 13.

In accordance with the present invention, a light transmissive disc 14 made of high temperature resistant material, preferably alpha-crystalline aluminum oxide is positioned at the combustion-side end of the quartz glass rod 12. The disc 14 is held in position by the metal sleeve 13 which, as seen in the drawing, is slightly rolled over at the end. The metal sleeve 13 forms the center electrode of the spark plug-sensor combination, the ground or chassis electrodes 15 extending from the housing 10, in well known manner, leaving a spark gap between the ends of the ground electrode 15 and the metal sleeve 13.

OPERATION

When inserted into the combustion chamber of an IC engine, the gap between the metal sleeve 13 and the ground or chassis electrode 15 forms a spark gap; simultaneously, the optical arrangement formed by the light transmissive element 14 and the quartz glass rod 12 will provide optical signals representative of conditions or events of combustion within the combustion chamber, to permit optical observation thereof. By use of the high temperature resistant material for the closing element 14, the optical guiding element, here the quartz glass rod 12 will be prevented from melting, thus insuring the integrity of light signal transmission outside of the housing 10, and preventing breakage, or other damage to the light guide formed by the glass rod 12. The glass rod 12, itself, can be coupled to a light guide cable positioned at the end structure of the spark plug housing 10 (not shown) for further transmission of optical signals to a photo diode, photo transistor or the like; or, alternatively, such a photo-electric transducer can be located on the housing 10 itself.

The sensor can be constructed separately from a spark plug, in which case the metal sleeve 13 and the ground or chassis electrodes 15 are not needed. The end element 14 of high temperature resistant material is then retained against the light transmissive element, here the quartz glass rod 12 by other means, for example by an extending portion of the insulating body 11 to which it is adhered, or bonded or fused.

Various changes and modifications may be made within the scope of the inventive concept.

We claim:

1. Combustion condition sensor to obtain an optical signal representative of combustion events in a combustion chamber, particularly a combustion chamber of an internal combustion engine having
    a tubular housing (10, 11) formed with an opening therethrough, and including means sealing the housing in the chamber,
    and a light transmissive light guide element (12) fitted in the opening located therein;
    and comprising, in accordance with the invention
    an end element (14) separating the combustion chamber from the light guide element to protect the light guide element from high combustion temperature consisting of a high temperature resistant light transmitting disc-like element (14).

2. A sensor according to claim 1 wherein the light guide element comprises a quartz glass rod; and said high temperature resistant light transmitting element (14) comprises a disc-like element of alpha-crystalline aluminum oxide.

3. A sensor according to claim 1 wherein said high temperature resistant light transmitting element comprises a body of alpha-crystalline aluminum oxide.

4. A sensor according to claim 1 wherein said light guide element comprises quartz glass.

5. A sensor according to claim 1 wherein the housing comprises a spark plug housing of electrically conductive material;
    a ground or chassis electrode (15) is positioned at the end of the housing extending into the combustion chamber;
    and a metal sleeve (13) is provided, insulatingly fitted into the bore of the housing, surrounding the light guide element and terminating adjacent the ground or chassis electrode, leaving a spark gap therebetween to form a combination spark plug-combustion condition sensor.

6. A sensor according to claim 5 wherein the portion of the metal sleeve terminating adjacent the ground or chassis electrode has an inturned flange holding said high temperature resistant, light transmitting element (14) in position in the housing and in light transmitting relation to light guide element (12).

7. A sensor according to claim 6 wherein the light guide element comprises a quartz glass rod;
    and said high temperature resistant light transmitting element (14) comprises a disc-like element of alpha-crystalline aluminum oxide.

8. A sensor according to claim 5 wherein the light guide element comprises a quartz glass rod;
    and said high temperature resistant light transmitting element (14) comprises a disc-like element of alpha-crystalline aluminum oxide.

9. A sensor according to claim 5 wherein said high temperature resistant light transmitting element comprises a body of alpha-crystalline aluminum oxide. pg,9

10. A sensor according to claim 5 wherein said light guide element comprises quartz glass.

* * * * *